United States Patent [19]

Fisher

[11] Patent Number: 6,085,696
[45] Date of Patent: Jul. 11, 2000

[54] LEASH ASSEMBLY FOR ANIMALS

[76] Inventor: Karol Fisher, 179-10 Union Turnpike, Jamaica Estates, N.Y. 11366

[21] Appl. No.: 08/780,447

[22] Filed: Jan. 8, 1997

[51] Int. Cl.[7] .................................................. A01K 27/00
[52] U.S. Cl. ............................................................ 119/798
[58] Field of Search .................................... 119/798, 795, 119/797, 791, 79.3, 79.4, 709, 792, 863, 865

[56] References Cited

U.S. PATENT DOCUMENTS

| | | | |
|---|---|---|---|
| 765,823 | 7/1904 | Erb, Jr. ...................................... | 119/863 |
| 3,214,166 | 10/1965 | Gaudet ................................. | 119/792 X |
| 3,760,532 | 9/1973 | Campion ............................. | 119/799 X |
| 3,867,905 | 2/1975 | Vail, Jr. .................................... | 119/793 |
| 3,884,190 | 5/1975 | Gurrey ..................................... | 119/797 |
| 4,020,795 | 5/1977 | Marks .................................. | 119/863 X |
| 4,165,713 | 8/1979 | Brawner et al. ......................... | 119/794 |
| 5,046,456 | 9/1991 | Heyman et al. ..................... | 119/863 X |
| 5,485,811 | 1/1996 | Jacobsen et al. ........................ | 119/798 |

FOREIGN PATENT DOCUMENTS 2264219  8/1993  United Kingdom ................... 119/798

*Primary Examiner*—Michael J. Carone
*Assistant Examiner*—Yvonne R. Abbott

[57] ABSTRACT

An improved leash assembly includes a handle for grasping by the owner and a line secured at one end to the handle and at the opposite end to the animal. The handle includes an elastic loop. The loop automatically expands if the animal tries to pull away from the owner to thereby apply a gentle fore between the owner and the animal. The force naturally increases as the animal pulls further however the onset of the force is gradual. In this manner the movement of the animal is automatically controlled while insuring that neither the animal nor the owner suffer any injuries.

18 Claims, 2 Drawing Sheets

LEASH ASSEMBLY FOR ANIMALS

BACKGROUND OF THE INVENTION a. Field of Invention

This invention pertains to leashes for animals, and more particularly to an improved leash having an elastic handle member.

B. Description of the Prior Art

Most local statutes and regulations require that when a person walks an animal, especially dogs, the animal must be 'curbed', i.e., the animal must have a leash. While these statues and rules are based hygienic principles, the leash is also advantages for the animal and its owner because it insures that owner does not loose control of the animal and that the animal does not run away. A typical leash available today consists of a handle being held by the owner, an extended member, hereinafter called a line, and a means for attaching the distal end of the line to a collar disposed about the neck of the animal. Alternatively, the collar may be part of the leash.

Typically the line, and the collar are usually made of flexible, inelastic materials such as braided ropes made of natural or artificial fibers, rubbers, metallic chains, or combinations of these materials. Some expensive leashes are arranged so that the handle includes a magazine for holding and paying out the line either automatically (in which case the line may be spring loaded) or manually, to make the length of the line variable.

A problem with all the prior art leashes is that frequently the animals being curbed bolt or try to take off and run very suddenly. This may occur if the animal is frightened, or when it perceives an object, person or other animal. However since the existing leashes are inelastic, as the animal starts moving away suddenly from its owner, when it reaches the end of the line, a sudden force is applied by the movement of the animal to both its collar and the handle. This action may result in discomfort, pain, and in extreme cases, even injury to the animal. In addition, if the animal is more than about 20 or 30 pounds it can exert a sufficient force on the handle to cause discomfort and pain to the owner. In fact, if a large dog of up to seventy pounds, or more, bolts, it can drag its owner with it and cause the owner serious injury. This may be especially true if the animal runs off the sidewalk into the middle of the street.

OBJECTIVES AND SUMMARY OF THE INVENTION

In view of the abovementioned disadvantages of existing leashes, it is the objective of the present invention to provide an improved leash assembly which automatically controls an animal's movements.

A further objective is to provide an improved leash assembly which gradually and self-adaptively reduces the forces on the animal and the owner if the animal tries to bolt.

Yet a further objective is to provide an improved leash assembly which is relatively inexpensive so that it can be made affordable to many costumers.

Other objectives and advantages of the invention shall become apparent from the following description. Briefly, an improved leash assembly constructed in accordance with this invention includes a flexible, elastic handle, a first coupler for coupling the handle to a line, and a second coupler for coupling said line to a collar. The collar is standard, as is the line.

DETAILED DESCRIPTION OF THE INVENTION

Figure 1:
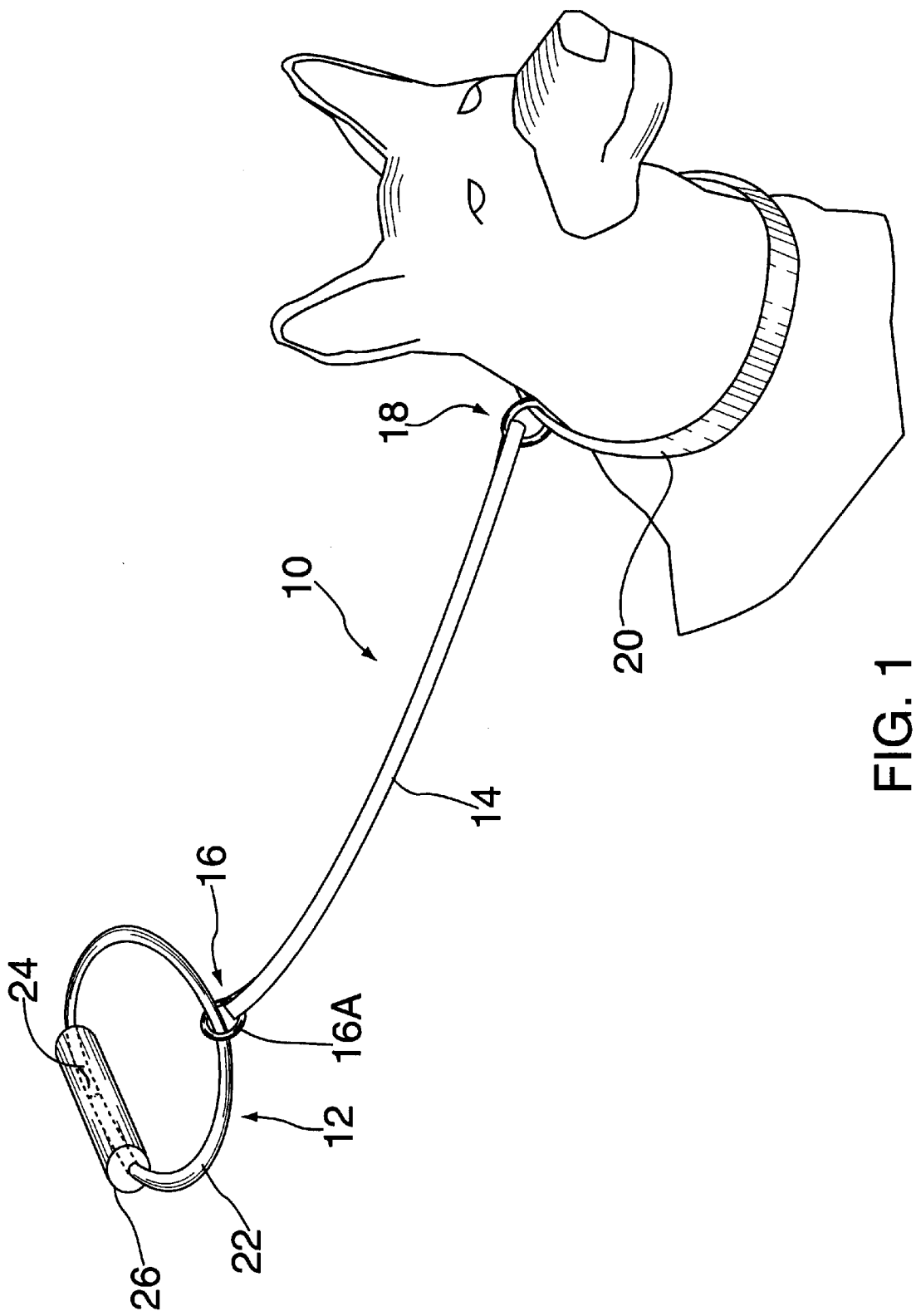
FIG. 1 shows in perspective side view an improved leash assembly constructed in accordance with this invention.

Referring to FIG. 1, an improved leash assembly 10 constructed in accordance with this invention includes a handle 12, a line 14 a first coupler 16 for coupling or connecting the handle 12 to line 14 and a second coupler 18 for connecting the line 14 to a collar 20. The collar 20 is attached to the animal's neck (not shown) in the normal manner. The couplers 16, 18 and the line 14 are standard items well known in the art and need not be described any further.

The key to the present invention is the structure of the handle 12. As seen in the figure, handle 12 consists of a loop 22 made of a flexible elastic material. For example the loop 22 may be made of ½" tubing made of a plastic such as LATEX® or other similar material. The ends of tubing are adhesively attached to each other, for example at joint 24, to close the tubing thereby forming loop 22. The loop 22 passes through a hoop 16A of coupler 16, as shown.

Mounted on the tubing is a straight cylindrical member 26 made of a stiffer material then loop 22. For instance, member 26 may be made of PVC. The cylindrical member 26 hides the connection 24 so that the loop 22 is more aesthetically pleasing. Even more importantly, the member 26 is grasped by the owner to hold the leash assembly 10. The member 26, loop 22 and line 12 can be may in a variety of matching or contrasting colors as desired.

Figure 2:
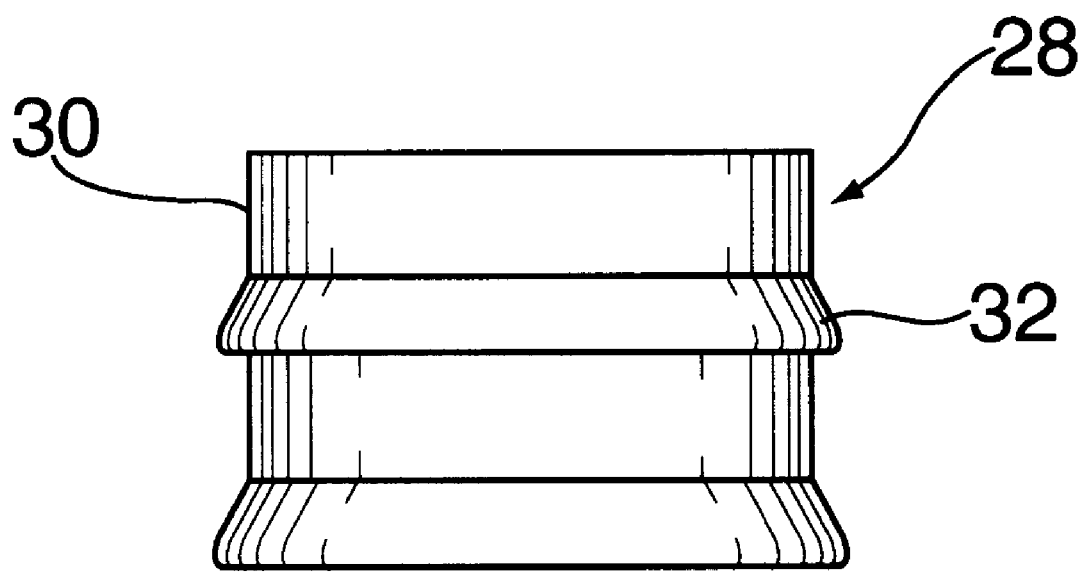
FIG. 2 shows details of a unidirectional plug used on the leash assembly of FIG. 1.

Preferably two cylindrical plugs 28 are used to interlock the member 26 and the tube 22. The plugs 28 are first mounted on the tube 22 and have an insert diameter just slightly larger than the tube 22 so that they form an interference fit therewith. Each plug 28 has an outer cylindrical surface 30 with two or more circumferential ribs 32. As clearly seen in FIG. 2, ribs 28 are not symmetrically. After the tube ends are coupled at joint 24 and the member 26 is positioned over the joint 24, the plugs 28 are slipped over the tube 12 and inserted into the respective ends of member 26 as shown in FIG. 1. The ribs 32 are shaped and sized so that, because of their slanted surfaces, they are easier to push into the member 26 then to be pulled out. As the plugs 28 are inserted into member 26 they may be slightly flexible so that they also squeeze tube 22 thereby forming a strong coupling between the member 26 and tube 22. In this manner the plugs 28 not only protect the joint 24 from tampering, but also relieve the joint from strain as the tube 22 is extended to thereby insure that the joint does not get separated.

The improved leash assembly operates as follows. Under normal conditions, as the owner and the dog are either standing still or walking along, there are substantially no forces applied on the dog or the owner and the leash is in a relaxed mode. If the dog tries to pull away from the owner (or vice versa) the line 14 becomes tight and the loop 22 starts expanding slowly due to its elasticity. As a result a gentle force develops between the owner and the leash (i.e. cylindrical member 26) with an equal and opposite force being applied to the dog's neck through collar 20. If the dog persists, the force increases gradually to a point where the dog cannot move any further. However at all times the onset of the forces described above is gentle and slow to allow the owner to adjust his grip and his shoulder (for a large dog) so that he can resist the dog's movement effectively, without being pulled or thrown off balance, and without suffering injury to the hand, wrist or shoulder.

Similarly the force on the dog's neck increases and decreases gradually as the loop 22 expands and contracts thereby insuring that throughout this process the dog is effectively controlled while at the same time preventing any injuries to its neck. It should be appreciated that throughout this process, i.e. the expansion and contraction of the loop 22, the owner does not have to take any special actions, since the loop 22 expands and contracts automatically thereby automatically controlling the movement of the dog.

The invention has been presented herein in conjunction with a specific pet, namely a dog, which nowadays can be fairly large. However, it should be appreciated that similar improved leashes can be made for other pets, or even children.

Obviously numerous modifications may be made to this invention without departing from its scope as defined in the appended claims.

I claim:

1. An improved leash assembly for controlling the movement of an animal by a handler, said leash assembly comprising:

an elongated line having a first and a second line end and a length defined between said ends, said second line end being adapted for coupling to said animal; and a handle coupled to said first line end and including a loop made of a material said material having an elasticity selected to insure that, as said animal moves away from said handler, and as a distance between said animal and said handler increases beyond said length, a force is applied through said leash assembly which is small enough to protect said handler and said animal from injury, said force gradually increasing as said distance increases;

wherein said handle further includes a grasping member, said loop having two loop ends engaging said grasping member, said grasping member being adapted to be grasped by said handler.

2. The leash assembly of claim 1 further comprising a coupler for coupling the other end of said line to said animal.

3. The leash assembly of claim 1 wherein said loop is made of a tubing.

4. The leash assembly of claim 1 wherein grasping member is made of a grasping material stiffer than said loop.

5. The leash assembly of claim 4 wherein said grasping member is made of PVC.

6. The leash assembly of claim 4 wherein said grasping member is tubular with said loop ends being disposed within said grasping member.

7. The leash assembly of claim 6 wherein said loop ends are joined within said grasping member.

8. The leash assembly of claim 6 further comprising two plugs mounting said loop ends within said grasping member.

9. The leash assembly of claim 8 wherein said plugs are one-way plugs which are easier to insert into said grasping member than to remove.

10. A leash assembly for use by a person for controlling the movement of an animal, said leash assembly comprising:

a line having a predetermined fixed length, a first end with a coupling hoop and a second end attached to said animal; and a handle attached to said first end and adapted to absorb a force generated when a distance between said person and said animal increases suddenly beyond said predetermined fixed length, said handle including a loop passing through said coupling hoop and made of a loop material selected to provide sufficient flexibility to allow said loop to expand gradually as said distance increases to protect said animal and said person from injury, said loop having loop ends and said handle further including a grasping member attached to said loop ends and provided for grasping by said person.

11. The leash assembly of claim 10 wherein said grasping member is made of a tube material stiffer than said loop material, said loop having loop ends inserted into said tube.

12. The leash assembly of claim 11 wherein said loop ends are joined to each other within said tube.

13. The leash assembly of claim 11 wherein said tube is made of PVC.

14. The leash assembly of claim 11 wherein said handle further comprises a plug for mounting one of said loop ends within said tube.

15. The leash assembly of claim 14 wherein said plug is shaped and constructed to form an interference fit when inserted into said tube.

16. The leash assembly of claim 15 wherein said plug is disposed annularly around said loop.

17. The leash assembly of claim 11 wherein said loop is tubular.

18. The leash assembly of claim 11 wherein said loop is made of an elastic material.

* * * * *